United States Patent [19]

Steigerwald

[11] 4,042,856
[45] Aug. 16, 1977

[54] CHOPPER BALLAST FOR GASEOUS DISCHARGE LAMPS WITH AUXILIARY CAPACITOR ENERGY STORAGE

[75] Inventor: Robert L. Steigerwald, Scotia, N.Y.

[73] Assignee: General Electric Company, Schenectady, N.Y.

[21] Appl. No.: 626,306

[22] Filed: Oct. 28, 1975

[51] Int. Cl.² .................... H05B 41/16; H05B 41/24
[52] U.S. Cl. ................................ 315/246; 315/208; 315/205; 315/283; 315/307; 315/227 R
[58] Field of Search ............... 315/208, 209 R, 224, 315/247, 287, 307, 283, 200 R, 207, DIG. 5, DIG. 7, 107, 106, 207, 205, 227; 307/64, 65, 66

[56] References Cited

U.S. PATENT DOCUMENTS

| | | | |
|---|---|---|---|
| 3,265,930 | 8/1966 | Powell, Jr. | 315/207 |
| 3,390,275 | 6/1968 | Baker | 307/64 |
| 3,659,147 | 4/1972 | Widmayer | 315/107 |
| 3,801,867 | 4/1974 | West et al. | 315/DIG. 5 |
| 3,836,815 | 9/1974 | Herzog | 307/66 |
| 3,906,243 | 9/1975 | Herzog | 307/66 |
| 3,913,002 | 10/1975 | Steigerwald et al. | 315/283 |
| 3,921,005 | 11/1975 | Watrous | 307/64 |

Primary Examiner—Saxfield Chatmon, Jr.
Attorney, Agent, or Firm—Donald R. Campbell; Joseph T. Cohen; Jerome C. Squillaro

[57] ABSTRACT

A single phase, high frequency chopper ballast without large magnetic and capacitive components for gaseous discharge lamps such as the Lucalox^R lamp is operated on full wave rectified line voltage. A small auxiliary capacitor stores energy during the peaks of the rectified line voltage when the voltage is high enough to maintain lamp discharge. During the low voltage valley regions the auxiliary capacitor is discharged to supply augmented chopper input voltage or load circuit voltage and provide energy to maintain lamp ionization during the valley regions until the rectified line voltage rises to a usable level.

11 Claims, 10 Drawing Figures

CHOPPER BALLAST FOR GASEOUS DISCHARGE LAMPS WITH AUXILIARY CAPACITOR ENERGY STORAGE

BACKGROUND OF THE INVENTION

This invention relates to solid state ballasts for gaseous discharge lamps, and more particularly to high frequency chopper ballasts without large magnetic and capacitive components that have additional energy storage circuitry to maintain lamp ionization during the valleys of the alternating current input voltage.

The common mercury lamp as well as other gaseous discharge lamps conventionally employ electromagnetic ballasts with bulky low frequency transformers and inductors and large power factor correction capacitors. A desirable high frequency chopper ballast that is highly efficient with low volume and light weight, with a good combination of features that an electronic ballast should have, is described in U.S. Pat. No. 3,890,537 granted on June 17, 1975 to John N. Park and Steven C. Peak jointly with the present inventor, and assigned to the assignee of this invention. This single phase, high frequency transistor chopper ballast operates on negligibly filtered full wave rectified line voltage and electronically shapes the line current by means of shaping the load current to obtain a high input power factor. Additionally, the d-c chopper ballast exhibits good regulation and starting current waveform, has low acoustic and radio frequency interference noise, eliminates acoustic resonance effects by sweeping the chopping frequency, and is stable over a usable temperature range.

The foregoing ballast circuit is especially suited for mercury vapor lamps, one feature being that during the valleys of the full wave rectified sinusoidal line voltage, minimum lamp current for good reignition characteristics in each cycle is maintained so that reignition occurs near the beginning of the cycle as the sinusoidal voltage rises. It will be evident that during the peaks of the 60 Hz wave sufficient voltage is available to operate the lamp normally, but as the rectified voltage falls toward zero there is not enough voltage available to keep the lamp running at its normal voltage and current. If the time during the valleys is longer than the deionization time of the lamp, the lamp may extinguish or considerable voltage may be needed for reignition on the subsequent rise of the 60 Hz wave. It is recognized that lamp deionization may be a complicated function of time but for simplicity of discussion the term "deionization time" is used here. For the mercury vapor lamp, the deionization time is sufficiently long that the lamp does not extinguish and reignition is obtained with the patented ballast at a relatively small voltage as the 60 Hz wave rises. Other gaseous discharge lamps such as the Lucalox (trademark of the General Electric Company) lamp, however, have a shorter deionization time than the mercury vapor lamp, perhaps as much as two to four times as fast. Accordingly, other techniques are needed to prevent such lamps from going out during the valleys of the sinusoidal energizing voltage and requiring a relatively high voltage to start up again.

A copending application by the inventor, Ser. No. 589,431, filed on June 23, 1975, entitled "Controlled Capacitive Filter for Active Loads", now U.S. Pat. No. 3,987,356, assigned to the same assignee, shows in FIG. 6 a ballast for a Lucalox lamp with a different type of filter. The present application relates to alternative arrangements with an auxiliary energy storage capacitor and control for use specifically as a lamp ballast.

SUMMARY OF THE INVENTION

In accordance with the invention, an electronic chopper ballast energized by low frequency full wave rectified line voltage, which desirably has a high frequency filter between the rectifier and chopper input terminals, additionally includes auxiliary capacitive energy storage means to provide augmented voltage to the chopper circuit and supply energy to maintain lamp ionization during the low voltage valley regions of the full wave rectified line voltage. The auxiliary capacitive energy storage circuitry includes an auxiliary capacitor which charges during the peak regions of the rectified sinusoidal or pulsating voltage when the voltage at the chopper input is sufficiently high to maintain lamp discharge. Upon sensing a predetermined low rectified voltage, a transistor or other auxiliary controlled switch device in series with the auxiliary capacitor is turned on to provide augmented chopper input voltage or load circuit voltage and supply energy to the lamp during the valley regions. Preferably the main controlled switch device controlling operation of the chopper circuit is operative to shape the lamp current during the valley regions until the voltage rises high enough to again maintain lamp conductivity.

In one group of embodiments the auxiliary capacitor and controlled switch device are connected in series across the chopper input terminals and the auxiliary capacitor is charged through a pair of diodes to the peak of the ac line voltage. Alternatively, or to supplement the foregoing, the auxiliary capacitor is charged from the transient voltage generated due to leakage inductance of a load transformer in an inverter load circuit. In either case the chopper input voltage is high enough that the chopper can be operated to provide shaped continuous or discontinuous lamp current. In another embodiment the auxiliary capacitor and controlled switch device are in series across the inverter load circuit so that increased load circuit voltage is provided directly during the valley regions. To shape the lamp current upon discharge of the auxiliary capacitor, an additional diode and control means can be provided to form a second chopper circuit operating during the valley regions. As was mentioned, this ballast is especially suited for Lucalox lamps and does not require large, low frequency magnetic and capacitive components.

DESCRIPTION OF THE PREFERRED EMBODIMENTS

Figure 1:
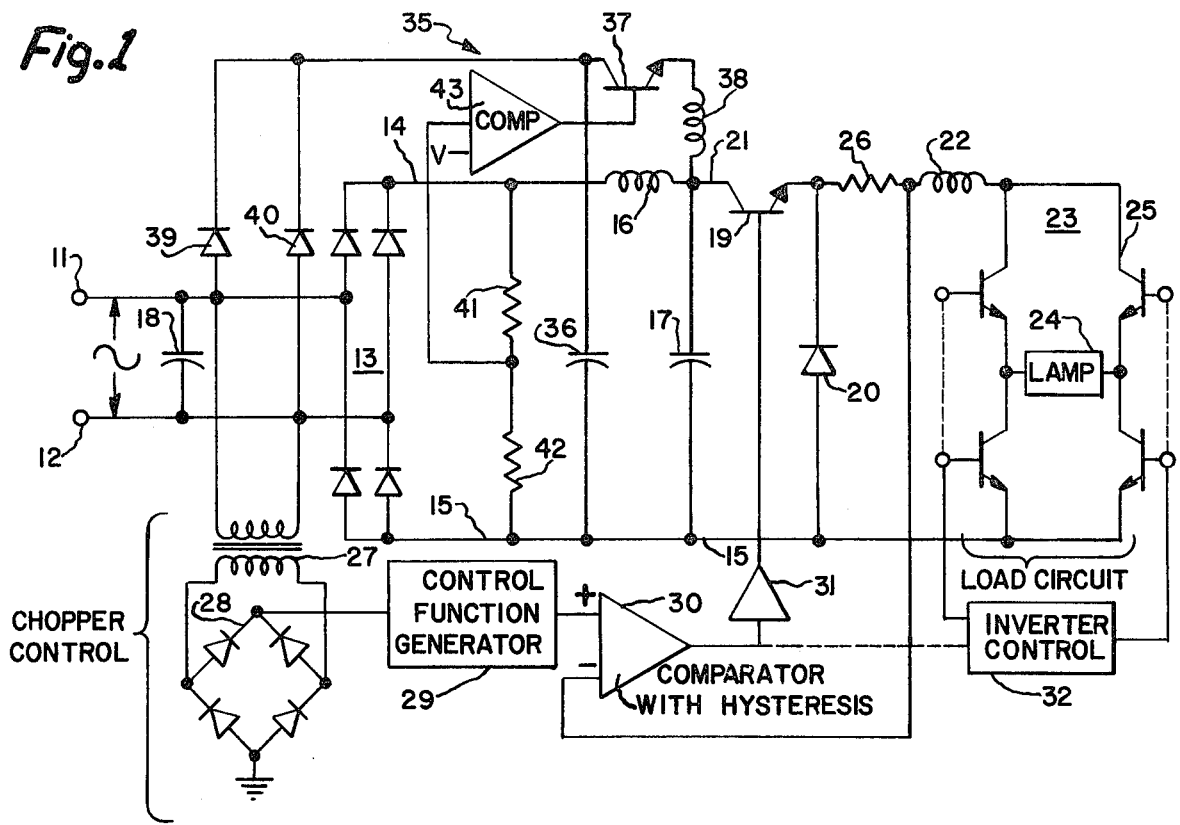
FIG. 1 is a schematic circuit diagram partially in block diagram form of one embodiment of a high frequency chopper ballast with the auxiliary capacitive energy storage circuit as herein described for supplying augmented voltage to the chopper during the valleys of the sinusoidal input voltage.

The single phase, d-c chopper ballast shown in FIG. 1 has a pair of input terminals 11 and 12 suitable for energization by a 60 Hz, 277 volt source of alternating current, although other power frequencies and voltages can be used including a 208 volt source depending on the application. A diode bridge rectifier 13 or other appropriate full wave rectifying means connected to the a-c input terminals produces at its output terminals a full wave rectified sinusoidal power voltage which, with respect to 60 Hz, is supplied essentially unfiltered to the chopper circuit. Desirably a high frequency filter comprised by an input filter inductor 16 and a shunt filter capacitor 17 is provided at the rectifier output, however filter capacitor 17 has a relatively low value of capacitance, on the order of 1 microfarad for 250-400 watt gaseous discharge lamps, and functions to provide a path for the high frequency current required by the chopper. Filter inductor 16 is a small high frequency inductor that provides high frequency filtering to prevent noise from being generated on the incoming a-c line, and can perform that function in conjunction with an additional high frequency capacitor 18 at the input terminals. Of course, other electromagnetic interference filter arrangements may be used.

In the chopper circuit, a power transistor 19 and power coasting diode 20 are in series between the chopper input terminals 21 and 15, and a coasting inductor 22 and inverter load circuit 23 are effectively in series across the coasting diode. Although the invention in its broader sense has application to other types of gaseous discharge lamps with a negative resistance characteristic, the load is preferably a Lucalox lamp 24, a multivapor gaseous discharge lamp that should be operated with alternating current. To achieve an a-c lamp excitation current, a full wave transistor bridge 25 is provided and other inverter configurations may also be used. For lamps that can be operated with d-c current, the bridge inverter is not needed. As is well known in the art, the dc-dc chopper supplies the load with a current magnitude depending on the ratio of the conducting and nonconducting intervals of power transistor 19, and coasting diode 20 provides a path for circulation of load current during the nonconducting intervals of the power transistor. The magnitude of the instantaneous lamp or load current is sensed by a small resistor 26 in series with coasting inductor 22 or by some other suitable current sensor.

Figure 2:
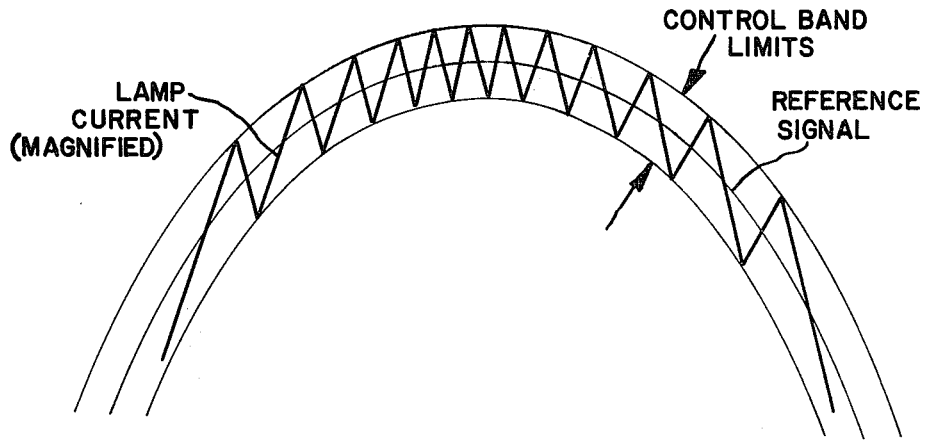
FIG. 2 is a fragmentary waveform diagram of a sinusoidal reference signal with control band limits for controlling operation of the chopper power transistor.
Figure 3:
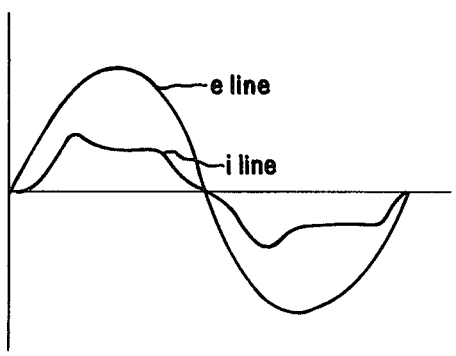
FIG. 3 shows waveform diagrams of the line voltage and electronically shaped line current for high input power factor.

During the peak regions of the full wave rectified pulsating or sinusoidal voltage supplied by the rectifier and high frequency filter to chopper input terminals 21 and 15, the voltage derived directly from the line is sufficiently high to maintain lamp conductivity and lamp discharge. Before proceeding to the subject matter of the present invention which relates to an auxiliary capacitive energy storage circuit to provide augmented voltage to the chopper circuit during the valley regions of the a-c line voltage and to supply energy to maintain lamp ionization during the valley regions, the normal operation of the chopper control circuit during the peak regions will be reviewed. For further information and a detailed circuit diagram of an exemplary chopper control, the reader is referred to the previously mentioned U.S. Pat. No. 3,890,537, the disclosure of which is incorporated herein by reference. The control circuit operates on the basis of continuously comparing the sensed lamp current with a preselected reference signal waveshape to thereby determine the high frequency switching rate of power transistor 19 and generate the desired lamp current waveshape. Other desirable operating characteristics include shaping the line current by means of shaping the lamp current to obtain a high input power factor exceeding 90 percent, automatic sweeping of the high frequency chopping rate to reduce acoustic resonance problems, and good regulation at a selected power input. In terms of a block diagram illustrating the main components of the chopper control, a sinusoidal control signal in phase with the a-c line voltage is obtained by means of a step-down transformer 27 that is connected across the lines and feeds a diode bridge rectifier 28. A control function generator 29 shapes the rectified control signal according to one or more selected control functions depending upon the type of load and control desired, generating at its output the previously mentioned reference signal. For high power factor and good regulation at a selected power level, the reference signal is a flattened sinusoidal signal with an electronically variable gain. In a comparator 30 with hysteresis, the reference signal is compared with a sensor signal indicative of the voltage across current sensor 26 which varies with the instantaneous load current, to thereby generate an output signal which is amplified by a suitable amplifier 31 and effectively supplied as the base drive signal to power transistor 19 to determine its alternating conducting and nonconducting intervals. With this arrangement (see FIG. 2) the limits of excursion of the rippled lamp current are determined by control band limits at either side of the reference signal and conforming to its shape, i.e., the reference signal plus hysteresis, and the reference signal minus hysteresis. The high frequency chopping rate of power transistor 19 is preferably between 10-40 kHz and varies systematically to avoid acoustic resonance effects. A suitable inverter control circuit 32 operates in conventional manner to alternately render conductive the diagonally opposite pairs of load circuit transistors to supply a-c current to lamp 24. The switching of the load circuit transistors can be synchronized with the switching of power transistor 19, as is indicated by the dashed line, but this is not essential to proper operation of the ballast. The forced, shaped lamp current also preferably has a waveshape that results in the proper line current waveshape for high input power factor. For a gaseous discharge lamp with the characteristics of a back emf load, the desired line current waveform is approximately as shown in FIG. 3. The shaped line current $I_{line}$ has increased current due to the ignition of the lamp near the beginning of the cycle, but is in phase with the sinusoidal line voltage and can be described as being roughly constant in the intermediate portion of the cycle, dropping at the end of the cycle in the valley regions of the line voltage. Although a power transistor is illustrated in FIG. 1 as being the main controlled switch device for the chopper circuit, a gate turn-off thyristor can also be used to control its operation.

In accordance with the invention, there is added to the chopper ballast and control an auxiliary capacitive energy storage circuit for storing energy during the peak regions of the rectified a-c line voltage and discharging this stored energy during the low voltage valley regions to thereby supply energy to maintain lamp ionization during the valley regions. With the added auxiliary circuit, which can be connected to supply augmented chopper input voltage or load circuit voltage, lamp discharge in a Lucalox lamp having a short deionization time (with respect to 60 Hz) is resumed near the beginning of the next cycle at a relatively low voltage level. As is well known to those skilled in the art, the Lucalox lamp is a multi-vapor lamp manufactured and distributed by the General Electric Company. In its preferred form, the auxiliary capacitive energy storage circuit indicated generally at 35 derives its energy from the a-c line and is comprised by a small auxiliary capacitor 36 and auxiliary transistor 37 or other auxiliary controlled switch device effectively connected in series with one another between the chopper input terminals 21 and 15. A small series inductor 38 is provided to limit transient currents into filter capacitor 17 when auxiliary transistor 37 is turned on. Auxiliary capacitor 36 is charged to the peak of the a-c line voltage by means of a pair of alternately conducting diodes 39 and 40, respectively coupled between the input terminals of rectifier 13 and the auxiliary capacitor. Further, means are provided for sensing the rectified sinusoidal voltage and rendering conductive auxiliary transistor 37 for the duration of the valley region below a preselected low voltage. To this end, a voltage divider comprising a pair of series resistors 41 and 42 is coupled directly between rectifier output terminals 14 and 15, and the signal level voltage at their junction is one input to an auxiliary comparator 43, the other input being a d-c voltage V representing the threshold of the valley region. The threshold of the falling 60 Hz a-c wave is selected such that substantial deionization does not occur in the valley region. When the rectified sinusoidal voltage falls below the threshold, comparator 43 generates an output turn-on signal for auxiliary transistor 37 which is continuously supplied until the rising sinusoidal voltage in the next cycle rises above the predetermined low voltage threshold. An alternative technique is to sense the voltage marking the beginning of the valley region and time the duration of the base drive signal using a one-shot multivibrator. In place of a transistor, the circuit can be implemented with a gate turn-off thyristor or an SCR as taught in the previously mentioned copending application, Ser. No. 589,431 by the inventor.

Figure 4A:
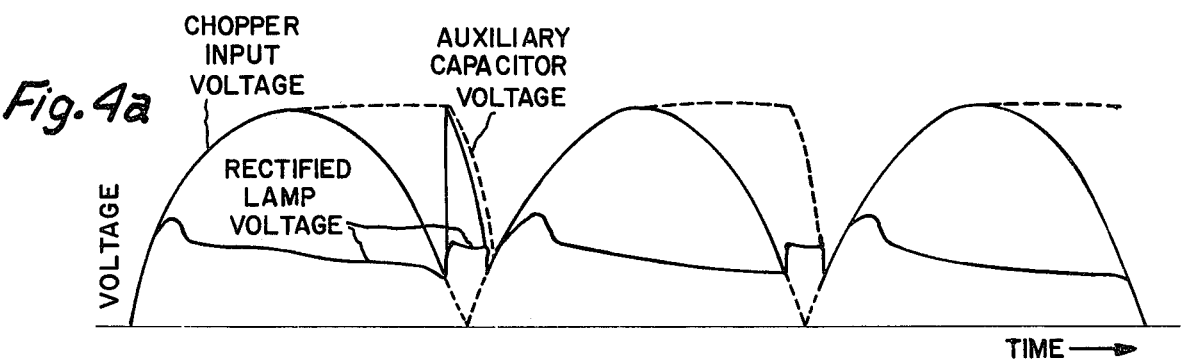
FIGS. 4a and 4b are ideal waveform diagrams of the chopper input voltage, auxiliary capacitor voltage, rectified lamp voltage, and rectified lamp current for the ballast in FIG. 1.
Figure 4B:
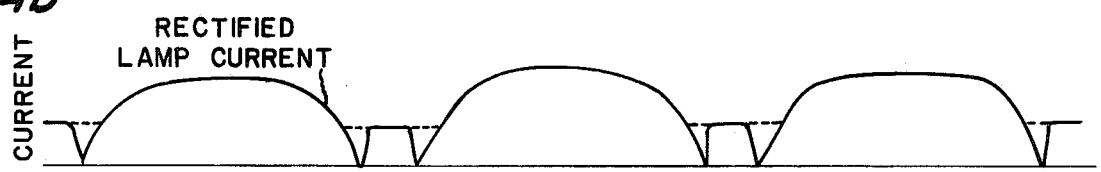

The operation of the auxiliary capacitive energy storage circuit, particularly during the valley regions, is explained with reference to the voltage and current waveforms in FIGS. 4a and 4b. Assuming that auxiliary transistor 37 has been rendered nonconductive, auxiliary capacitor 36 charges through either diode 39 or diode 40 to the peak of the a-c line voltage, for instance approximately 390 volts for a 277 volt source. As the sinusoidal chopper input voltage shown in full lines begins to decrease, the auxiliary capacitor voltage shown in dashed lines remains approximately at peak level. The lamp voltage, illustrated here as being rectified although actually an a-c voltage, has a small peak at reignition near the beginning of the cycle and begins to drop near the end of the cycle when the decreasing chopper input voltage is not sufficiently high to maintain lamp discharge. At this point, or slightly beyond, the voltage sensor signal supplied to comparator 43 representing the instantaneous rectified sinusoidal line voltage falls below the predetermined low voltage reference V, thereby providing an output signal for turning on auxiliary transistor 37 for the duration of the arbitrarily defined valley region. The full voltage on auxiliary capacitor 36 is thus applied to the chopper input terminals and the chopper input voltage rises abruptly and then begins to fall during the valley region as the auxiliary capacitor discharges and supplies lamp current and energy to maintain lamp ionization. The current drawn from auxiliary capacitor 36 is shaped in a predetermined manner, preferably to supply a predetermined constant level of lamp current during the valley region, by proper control of chopper power transistor 19. For the lamp current waveshape shown in FIG. 4b, the reference signal in the chopper control circuit has a flattened sinusoidal shape during the peak regions and during the valley regions, and just prior to and after the valley regions as indicated by the dashed lines, is at a constant level equal to the predetermined constant lamp current needed to maintain ionization. There is also an increased level of lamp voltage during the valley regions (FIG. 4a). It is realized that both the lamp voltage and lamp current in the valley region actually has a ripple waveform due to normal operation of the chopper circuit as the power transistor switches on and off. As the rising rectified sinusoidal voltage begins to exceed the reference level, auxiliary comparator 43 switches to the low output signal condition and auxiliary transistor 37 turns off, but the a-c line voltage at this time is high enough to sustain lamp discharge as the chopper and lamp once again derive their main power from the a-c line.

Figure 5A:
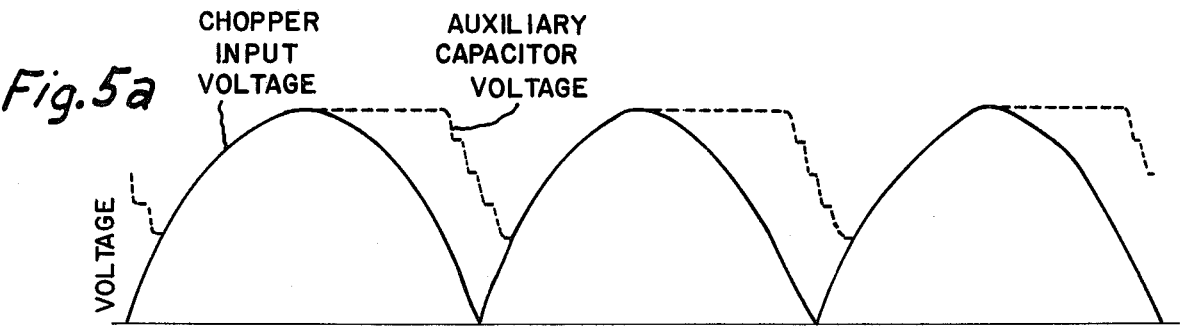
FIGS. 5a and 5b are similar to FIGS. 4a and 4b for another mode of operation during the valleys of the input voltage to reduce the capacitance value of the auxiliary capacitor.
Figure 5B:
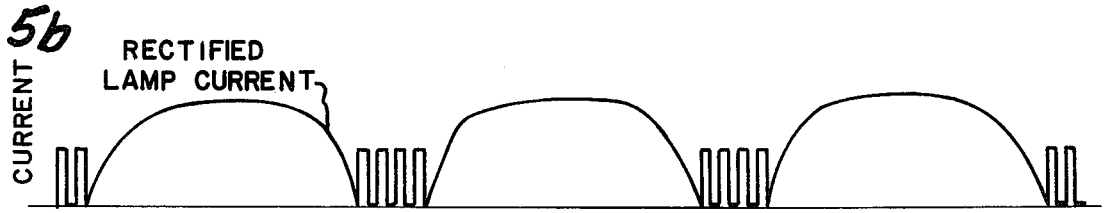

To minimize the capacitance value of auxiliary capacitor 36, the current supplied to the lamp during the valley regions should be as small and as narrow as possible consistent with proper lamp operation. To further reduce the size of the auxiliary energy storage capacitor, a mode of operation in which the current drawn from the auxiliary capacitor is intermittently discontinuous such as is shown in FIGS. 5a and 5b is desirable. During the valley regions, the chopper control circuit operates power transistor 19 to generate the discontinuous lamp current waveshape with alternating periods of relatively high current and relatively low current. The reference signal has the same waveshape as the rectified lamp current in FIG. 5b, where for purposes of illustration four current spikes during the valleys are shown. The auxiliary capacitor voltage comes down in steps as depicted in FIG. 5a.

Figure 6:
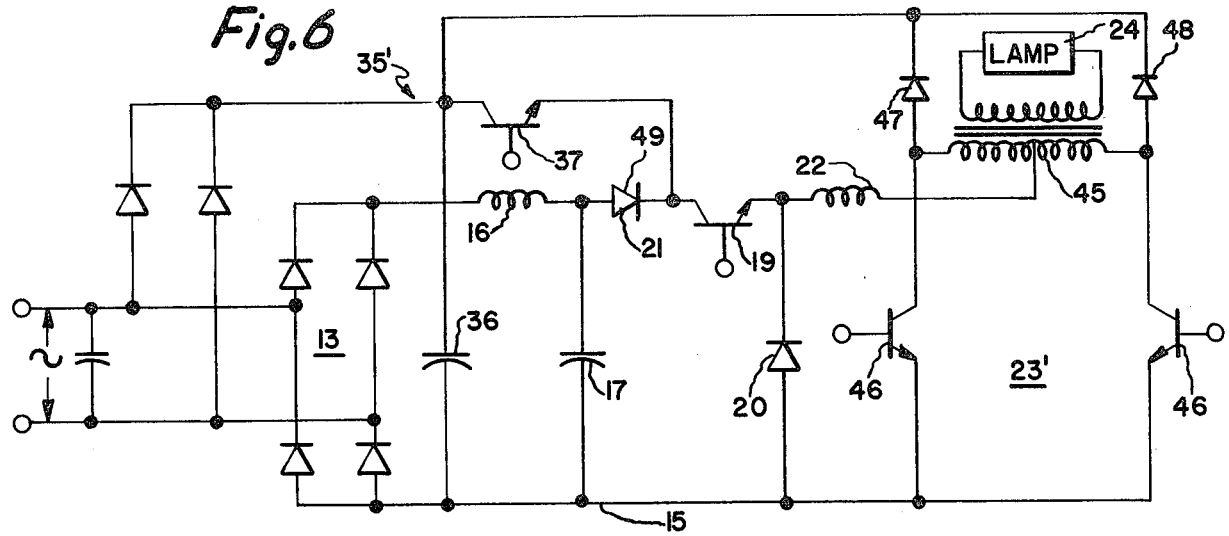
FIG. 6 is a schematic power circuit diagram similar to FIG. 1 including a modification of the auxiliary capacitive energy storage circuit for use with a two-transistor inverter and transformer-coupled lamp.

FIG. 6 illustrates a modification of the embodiment of FIG. 1 wherein the inverter load circuit includes a load transformer and auxiliary capacitive energy storage means 35' is comprised by additional means for charging the auxiliary capacitor from the transient voltage generated due to leakage inductance of the load transformer. Two-transistor inverter load circuit 23' includes a pair of alternately conducting transistors 46 connected between either end of the primary winding of load transformer 45 and negative chopper terminal 15, the center tap of the primary winding being coupled directly to coasting inductor 22. Since the chopper is essentially a current source, transient voltages are generated as the power transistors are switched due to the leakage inductance between the two halves of the transformer primary winding. The voltage appearing at the inverter transistors during switching is clamped by a pair of alternately conducting feedback diodes 47 and 48 connected between either end of the load transformer primary winding and auxiliary capacitor 36. Thus, the auxiliary capacitor is charged from the a-c line voltage as before and additional voltage from the load transformer that would otherwise be wasted is recirculated back to aid the charging. Another modification shown in FIG. 6 is that small inductor 38 previously shown in series with auxiliary transistor 37 to limit transient current into high frequency filter capacitor 17 is eliminated, and its function assumed by a blocking diode 49 placed in series with high frequency filter inductor 16 and the collector of power transistor 19. Upon rendering conductive auxiliary transistor 37 during the valley regions to supply augmented chopper input voltage, blocking diode 49 isolates the low voltage on filter capacitor 17 from the high voltage on auxiliary capacitor 36.

Figure 7:
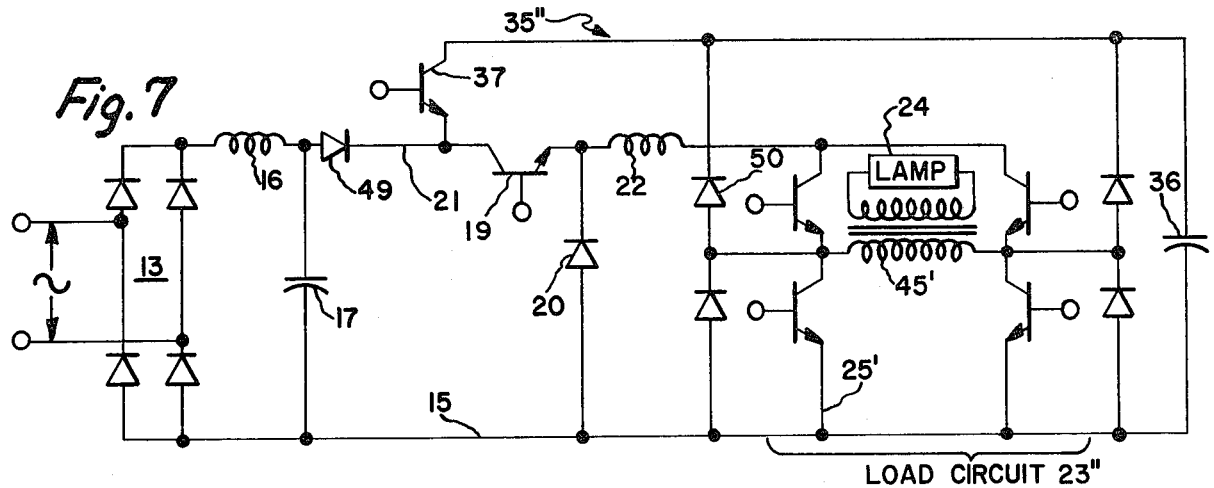
FIG. 7 illustrates the chopper ballast with another embodiment of the auxiliary capacitive energy storage circuit wherein the auxiliary capacitor is charged from an inverter with a transformer-coupled lamp.

FIG. 7 shows the high frequency chopper ballast with another embodiment of the auxiliary capacitive energy storage circuit that like the previous embodiments supplies augmented chopper input voltage, but in which the sole means for charging the auxiliary capacitor utilizes the voltage generated due to leakage inductance of the load transformer. The load transformer in this case has sufficient leakage inductance or is designed to have sufficient leakage inductance. In the chopper, load circuit 23" is comprised by a full bridge transistor inverter 25' having a load transformer 45' for supplying energy to lamps 24. As before, auxiliary transistor 37 and auxiliary capacitor 36 are effectively connected in series between chopper input terminals 21 and 15, however auxiliary capacitive energy storage circuit 35" additionally includes four diodes 50 to provide means for charging the auxiliary capacitor. As illustrated, two of these diodes are connected between either end of the primary winding of load transformer 45' and negative chopper input terminal 15, while the other two provide a path for current between either end of the primary winding and auxiliary capacitor 36. A diagonally opposite pair is forward biased at the beginning of each inverter half cycle to provide a path for the current stored in the transformer leakage inductance. By proper selection of auxiliary capacitor 36 and the leakage inductance, assuming high frequency operation of the inverter, the voltage on auxiliary capacitor 36 may be pumped up to as high as 1000 volts and still be in the voltage range of relatively inexpensive transistors. This higher voltage allows considerable energy to be stored in a relatively small value of capacitance. Diodes 50 must also be rated for the peak voltage to which the auxiliary capacitor is charged. During the valley regions, the auxiliary capacitor is discharged as previously described and chopper power transistor 19 is operated at a high frequency chopping rate to control the lamp current waveshape.

Figure 8:
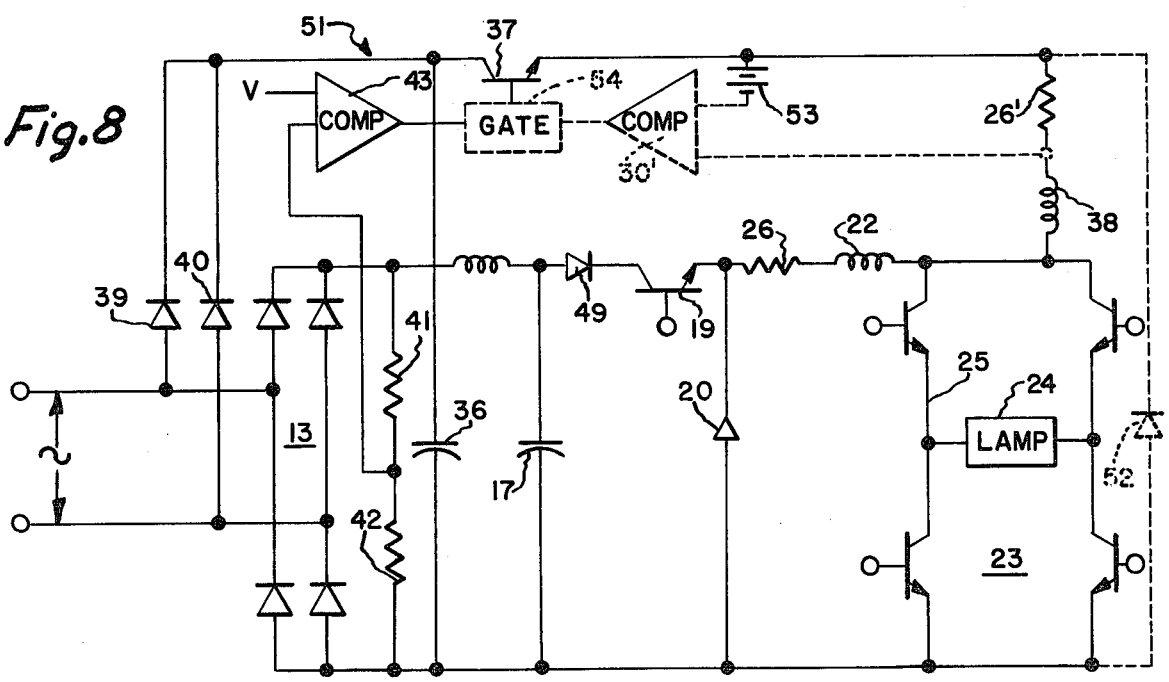
FIG. 8 illustrates the chopper ballast with yet another embodiment of the auxiliary capacitive energy storage circuit in which energy is discharged directly into the load circuit, including in dashed lines an alternate arrangement in which a second chopper is provided to shape the lamp current.

FIG. 8 illustrates the transistor dc chopper ballast with a different embodiment of the auxiliary capacitive energy storage circuit that is charged from the a-c line voltage but as distinguished from the previous embodiments discharges energy directly to the inverter load circuit. The energy stored on the auxiliary capacitor is discharged in an uncontrolled or controlled manner and supplies augmented voltage across the inverter lead circuit and energy to maintain lamp ionization during the valley regions. The basic auxiliary capacitive energy storage circuit 51 is illustrated in full lines in FIG. 8, and a modification to shape the current discharged by auxiliary capacitor 36 requires additional components illustrated in dashed lines. The basic approach is identical to that in FIG. 1 with the exception that series connected auxiliary capacitor 36, auxiliary transistor 37, and small inductor 38 are connected across full bridge inverter load circuit 23. A small auxiliary current sensor resistor 26' is not needed for the basic circuit. Thus, auxiliary capacitor 36 is charged to the peak of the a-c line voltage, and when the rectified sinusoidal voltage drops to a predetermined low voltage level, comparator 43 produces an output signal that is assumed to be supplied directly to the base of auxiliary transistor 37, turning it on to apply the peak voltage on auxiliary capacitor 36 across full bridge inverter 25. As was mentioned, the capacitor discharge is uncontrolled and accordingly the current lamp waveshape is not controlled.

In the modification to obtain controlled capacitor discharge, the auxiliary capacitive energy storage circuit includes additional components to operate as a second chopper during the valley regions. For this reason, a second coasting diode 52 is provided across small inductor 38 and inverter load circuit 23. The second chopper control circuit includes another comparator 30' with hysteresis having as one input a voltage signal representative of the instantaneous lamp current sensed by sensor resistor 26', the other input being a constant d-c reference signal here represented by a battery 53. An AND gate 54 at the base of auxiliary transistor 37 requires both an output signal from comparator 30' and an output signal from comparator 43 in order to transmit a base drive signal to auxiliary transistor 37. With this arrangement, auxiliary transistor 37 is inhibited from turning on until the sensing of the predetermined low voltage marking the beginning of the low voltage valley region. During the valley region, auxiliary transistor 37 is operated at a high frequency chopping rate to supply constant lamp current at a predetermined current level to lamp 24 to maintain lamp ionization.

In summary, the high frequency chopper ballast herein described does not require large low frequency magnetic and capacitive components and is capable of ballasting Lucalox and other lamps that require auxiliary energy during the valley regions to maintain lamp ionization. The chopper ballast operates on negligibly filtered rectified a-c line voltage and can incorporate the many desirable features discussed at length in U.S. Pat. No. 3,890,537 including the lamp and line current waveshaping for high input power factor, good regulation at a selected power level, high efficiency, etc.

While the invention has been particularly shown and described with reference to several preferred embodiments thereof, it will be understood by those skilled in the art that the foregoing and other changes in form and details may be made therein without departing from the spirit and scope of the invention.

The invention claimed is:

1. A solid state ballast for gaseous discharge lamps comprising full wave rectifying means for energization by low frequency alternating-current line voltage and supplying rectified pulsating voltage to a pair of chopper input terminals, chopper circuit means including a main controlled switch device for controlling the operation thereof and a load circuit for supplying lamp current to a gaseous discharge lamp, said chopper circuit means being energized by a sufficiently high voltage during peak regions of the rectified pulsating voltage to maintain lamp discharge, auxiliary capacitive energy storage means for storing energy during the peak regions and discharging said stored energy during low voltage valley regions of the rectified pulsating voltage to supply augmented voltage to said chopper circuit means and maintain lamp ionization during the valley regions, and control means for operating said main controlled switch device at a high frequency switching rate to generate a preselected lamp current waveshape at least during the peak regions of the rectified pulsating voltage, said auxiliary capacitive energy storage means being comprised by an auxiliary capacitor effectively connected in series with an auxiliary controlled switch device between said chopper input terminals to supply augmented chopper input voltage, means for charging said auxiliary capacitor from the alternating-current line voltage, and means for sensing the rectified pulsating voltage and rendering conductive said auxiliary controlled switch device when the rectified pulsating voltage falls below a predetermined low voltage, said control means further operating said main controlled switch device to generate a preselected lamp current waveshape in the valley regions of the rectified pulsating voltage.

2. A solid state ballast according to claim 1 wherein said load circuit is comprised by a load transformer, and said auxiliary capacitive energy storage means further includes additional means for charging said auxiliary capacitor from the transient voltage generated due to the leakage inductance of said load transformer.

3. A solid state ballast for gaseous discharge lamps comprising full wave rectifying means for energization by low frequency alternating-current line voltage and supplying rectified pulsating voltage to a pair of chopper input terminals, chopper circuit means including a main controlled switch device for controlling the operation thereof and a load circuit for supplying lamp current to a gaseous discharge lamp, said chopper circuit means being energized by a sufficiently high voltage during peak regions of the rectified pulsating voltage to maintain lamp discharge, auxiliary capacitive energy storage means for storing energy during the peak regions and discharging said stored energy during low voltage valley regions of the rectified pulsating voltage to supply augmented voltage to said chopper circuit means and maintain lamp ionization during the valley regions, and control means for operating said main controlled switch device at a high frequency switching rate to generate a preselected lamp current waveshape at least during the peak regions of the rectified pulsating voltage, said load circuit being comprised by an inverter with a load transformer, said auxiliary capacitive energy storage means being comprised by an auxiliary capacitor effectively in series with an auxiliary controlled switch device between said chopper input terminals, means for charging said auxiliary capacitor from the transient voltage generated due to the leakage inductance of said load transformer, and means for sensing the rectified pulsating voltage and rendering conductive said auxiliary controlled switch device when the rectified pulsating voltage falls below a predetermined low voltage, to thereby supply augmented chopper input voltage, said control means further operating said main controlled switch device to generate a predetermined lamp current waveshape in the valley regions of the rectified pulsating voltage.

4. A solid state ballast for gaseous discharge lamps comprising full wave rectifying means for energization by low frequency alternating-current line voltage and supplying rectified sinusoidal voltage to a pair of chopper input terminals, chopper circuit means including a main controlled switch device for controlling the operation thereof and a load circuit for supplying lamp current to a gaseous discharge lamp, said chopper circuit means being energized by a sufficiently high voltage during peak regions of the rectified sinusoidal voltage to maintain lamp discharge, auxiliary capacitive energy storage means for storing energy during each peak region and discharging said stored energy during the subsequent low voltage valley region of the rectified sinusoidal voltage to supply augmented voltage to said chopper circuit means and maintain lamp ionization during the valley regions, and control means for operating said main controlled switch device at a high frequency switching rate to generate a preselected lamp current waveshape at least during the peak regions of the rectified sinusoidal voltage, said auxiliary capacitive energy storage means being comprised by an auxiliary capacitor effectively connected in series with an auxiliary controlled switch device and an inductor across said load circuit, means for charging said auxiliary capacitor from the alternating current line voltage, and means for sensing the rectified sinusoidal voltage and rendering conductive said auxiliary controlled switch during each interval the rectified sinusoidal voltage falls below a predetermined low voltage, to thereby supply augmented voltage to the load circuit.

5. A solid state ballast according to claim 4 wherein said auxiliary capacitive energy storage means further includes a diode connected across said inductor and load circuit to thereby provide in combination with said auxiliary controlled switch device a second chopper circuit, and second control means for operating said auxiliary controlled switch device at a high frequency switching rate to generate a preselected lamp current waveshape during the low voltage valley regions of the rectified pulsating voltage.

6. A solid state ballast for gaseous discharge lamps comprising full wave rectifying means and high frequency filter means for energization by low frequency alternating-current line voltage and supplying rectified sinusoidal voltage to a pair of chopper input terminals, chopper circuit means including a main controlled switch device for controlling the operation thereof and an inverter load circuit for supplying lamp current to a gaseous discharge lamp, said chopper circuit means being energized by a sufficiently high voltage during peak regions of the rectified sinusoidal voltage to maintain lamp discharge, auxiliary capacitive energy storage means comprising an auxiliary capacitor and an auxiliary controlled switch device connected in series between said chopper input terminals for storing energy during each peak region and discharging said stored energy during the subsequent low voltage valley region of the rectified sinusoidal voltage to supply augmented chopper input voltage between the chopper input terminals and provide energy to maintain lamp ionization during the valley regions, and control means for operating said inverter load circuit and for operating said main controlled switch device at a high frequency chopping rate to generate a preselected lamp current waveshape during both the peak regions and valley regions of the rectified sinusoidal voltage.

7. A solid state ballast for gaseous discharge lamps comprising full wave rectifying means and high frequency filter means for energization by low frequency alternating-current line voltage and supplying rectified sinusoidal voltage to a pair of chopper input terminals, chopper circuit means including a main controlled switch device for controlling the operation thereof and an inverter load circuit for supplying lamp current to a gaseous discharge lamp, said chopper circuit means being energized by a sufficiently high voltage during peak regions of the rectified sinusoidal voltage to maintain lamp discharge, auxiliary capacitive energy storage means for storing energy during the peak regions and discharging said stored energy during low voltage valley regions of the rectified sinusoidal voltage to supply augmented chopper input voltage between the chopper input terminals and provide energy to maintain lamp ionization during the valley regions, and control means for operating said inverter load circuit and for operating said main controlled switch device at a high frequency chopping rate to generate a preselected lamp current waveshape during both the peak regions and valley regions of the rectified sinusoidal voltage, said auxiliary capacitive energy storage means being comprised by an auxiliary capacitor effectively connected in series with an auxiliary controlled switch device between said chopper input terminals, a pair of alternately conducting diodes respectively connected between input terminals of said full wave rectifying means and said auxiliary capacitor for charging said auxiliary capacitor to the peak of the alternating-current line voltage, and means for sensing the rectified sinusoidal voltage and rendering conductive said auxiliary controlled switch device during the interval the rectified sinusoidal voltage is below a predetermined low voltage.

8. A solid state ballast according to claim 7 wherein said inverter load circuit includes a load transformer with inductively coupled primary and secondary windings, and said auxiliary capacitive energy storage means further includes at least one additional pair of diodes respectively connected between either end of said primary winding and said auxiliary capacitor for additionally charging said auxililary capacitor from the transient voltage generated due to the leakage inductance of said load transformer.

9. A solid state ballast for gaseous discharge lamps comprising full wave rectifying means and high frequency filter means for energization by low frequency alternating-current line voltage and supplying rectified sinusoidal voltage to a pair of chopper input terminals, chopper circuit means including a main controlled switch device for controlling the operation thereof and an inverter load circuit for supplying lamp current to a gaseous discharge lamp, said chopper circuit means being energized by a sufficiently high voltage during peak regions of the rectified sinusoidal voltage to maintain lamp discharge, auxiliary capacitive energy storage means for storing energy during each peak region and discharging said stored energy during the subsequent low voltage valley region of the rectified sinusoidal voltage to supply augmented chopper input voltage between the chopper input terminals and provide energy to maintain lamp ionization during the valley regions, and control means for operating said inverter load circuit and for operating said main controlled switch device at a high frequency chopping rate to generate a preselected lamp current waveshape during both the peak regions and the valley regions of the rectified sinusoidal voltage, said inverter load circuit including a load transformer with inductively coupled primary and secondary windings, said auxiliary capacitive energy storage means being comprised by an auxiliary capacitor effectively connected in series with an auxiliary controlled switch device between said chopper input terminals, and at least one pair of alternately conducting diodes respectively connected between either end of said primary winding and said auxiliary capacitor for charging said auxiliary capacitor to the peaks of the transient voltages generated due to the leakage inductance of said load transformer.

10. A solid state ballast for gaseous discharge lamps comprising full wave rectifying means and high frequency filter means for energization by low frequency alternating-current line voltage and supplying rectified sinusoidal voltage to a pair of chopper input terminals, chopper circuit means including a main controlled switch device for controlling the operation thereof and an inverter load circuit for supplying lamp current to a gaseous discharge lamp, said chopper circuit means being energized by a sufficiently high voltage during peak regions of the rectified sinusoidal voltage to maintain lamp discharge, auxiliary capacitive energy storage means for storing energy during the peak regions and discharging said stored energy during low voltage valley regions of the rectified sinusoidal voltage to supply augmented voltage across said inverter load circuit and provide energy to maintain lamp ionization during the valley regions, and control means for operating said inverter load circuit and for operating said main controlled switch device at a high frequency chopping rate to generate a preselected lamp current waveshape during the peak regions of the rectified sinusoidal voltage, said auxiliary capacitive energy storage means being comprised by an auxiliary capacitor effectively connected in series with an auxiliary controlled switch device and an inductor across said inverter load circuit, a pair of alternately conducting diodes respectively connected between input terminals of said full wave rectifying means and said auxiliary capacitor for charging said auxiliary capacitor to the peak of the alternating-current line voltage, and means for sensing the rectified sinusoidal voltage and rendering conductive said auxiliary controlled switch device during the interval the rectified sinusoidal voltage is below a predetermined low voltage.

11. A solid state ballast according to claim 10 wherein said auxiliary capacitive energy storage means further includes a diode connected across said inductor and inverter load circuit to thereby provide in combination with said auxiliary controlled switch device a second chopper circuit, and second control means for operating said auxiliary controlled switch device at a high frequency chopping rate to generate a preselected lamp current waveshape during the low voltage valley regions of the rectified sinusoidal voltage.

* * * * *